Dec. 21, 1965    RYUTARO MORI ET AL    3,224,020
DIFFERENTIAL PRESSURE TRANSDUCERS
Filed Dec. 31, 1962
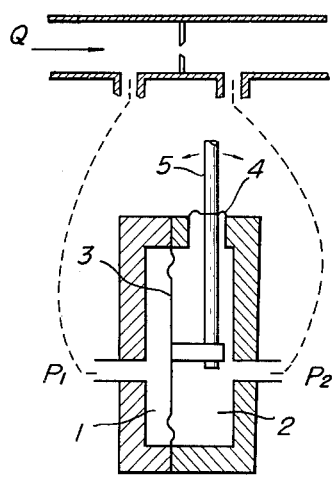
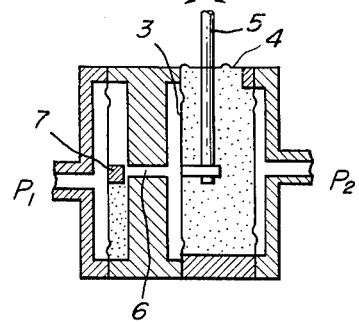
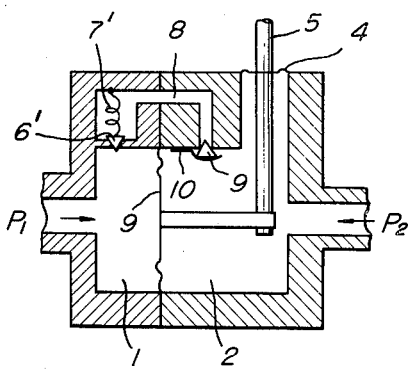
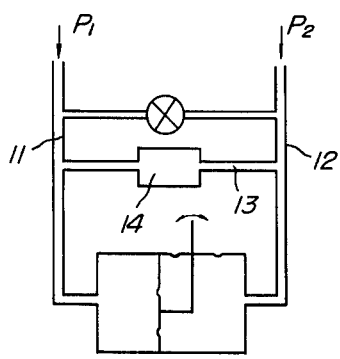
INVENTORS
Ryutaro Mori
Akira Kurabayashi
By: Paul M. Craig, Jr.
ATTORNEY

United States Patent Office 3,224,020
Patented Dec. 21, 1965

3,224,020
DIFFERENTAL PRESSURE TRANSDUCERS
Ryutaro Mori and Akira Kurabayashi, Tokyo, Japan, assignors to Hitachi Ltd., Tokyo, Japan, a corporation of Japan
Filed Dec. 31, 1962, Ser. No. 248,797
Claims priority, application Japan, Jan. 5, 1962, 37/99
1 Claim. (Cl. 91—165)

The present invention relates to differential pressure transducers and particularly to those of the type including a high and a low pressure chamber and a diaphragm or like movable member displaceable in response to the pressure difference between the two chambers.

The present invention is designed to eliminate any permanent deformation of the movable member which may otherwise occur under overload by equalizing the pressures in the two pressure chambers.

According to the present invention, a differential pressure transducer of the type described comprises a fluid passage interconnecting the high and low pressure chambers directly or indirectly with each other and a valve mechanism operable only when the fluid passage is fed with an excessively large input.

Description will now be made with reference to the accompanying drawing, which diagrammatically illustrates a few preferred embodiments of the invention and in which like reference characters indicate like parts throughout the several figures.

In the drawing: FIGS. 1 and 2 illustrates conventional forms of pressure difference transducer in cross section;

And FIGS. 3 and 4 illustrate different embodiments of the invention.

For measurement and control of a flow of fluid or a fluid level, generally an orifice or the like is arranged in the fluid passage and the difference in pressure between the upstream and downstream of the orifice is detected to determine the quantity to be measured. This method is simple, relatively high in accuracy and thus is used most widely.

Referring first to FIG. 1, reference numerals 1 and 2 indicate a high and a low pressure chamber, respectively; reference numeral 3 a diaphragm; 4 a sealing diaphragm; and 5 a force-transmitting rod. In operation, fluid pressures $P_1$ and $P_2$ on the upstream and downstream sides, respectively, of an orifice are directed to the high and low pressure chambers 1 and 2 and the displacement of the detecting diaphragm, which is proportional to the differential pressure, $|P_1-P_2|$, is transformed into a mechanical force, which acts to displace the force-transmitting rod 5 about the sealing diaphragm as a fulcrum. The displacement of the rod 5 is transformed by a device such as a nozzle flapper or a differential pressure transducer into a pneumatic or electrical signal. In this conventional form of differential pressure transducer, however, if any unusual state occurs as in the fluid passage to supply an extraordinarily high pressure only to one of the pressure chambers, the detecting diaphragm 3 is heavily displaced to one side thereof to cause its permanent deformation, which frequently gives rise to a substantial measuring error.

As a remedy to this, various proposals have been made including one illustrated in FIG. 2. With the form of transducer illustrated in FIG. 2, the lower pressure $P_2$ is applied upon the diaphragm 3 not directly but through the intermediary of a suitable fluid. Similarly, the higher pressure $P_1$ is applied upon the diaphragm 3 by way of a passage 6 enclosing a quantity of fluid. Another diaphragm 7 is arranged so as to close the passage 6 when $P_1 \gg P_2$ for example under overload. This arrangement, however, involves extremely difficult problems relative, say, to the sealing of the enclosed fluid when viewed from the machining and fabrication standpoints.

The present invention resorts to a novel measure to deal with the overloading without employing the enclosed fluid described above or other conventional means. According to the invention, a valve is provided between the high and low pressure chambers which does not operate under normal pressures but is operable only when a pressure of a predetermined value or a higher one is applied. In the event that an excessively high pressure is supplied to only one of the pressure chambers, the valve operates to direct the pressure also into the other pressure chamber to equalize the pressures in the two pressure chambers for the purpose of preventing any permanent deformation of the diaphragm and other parts as otherwise occurring under overload conditions. This arrangement not only may advantageously be made use of with extreme case with all forms of differential pressure transducer but may readily be employed with any existing differential pressure transducer.

Referring next to FIG. 3, which illustrates one embodiment of the invention, reference numeral 6' indicates a relief valve normally seated against the adjacent wall of the high pressure chamber 1 under the bias of a spring 7'. A bypass 8 interconnects the high and low pressure chambers 1 and 2. Another relief valve 9 is seated against the adjacent wall of the low pressure chamber 2 under the bias of a leaf spring 10.

In operation, if an excessively high pressure that exceeds the resiliency of the spring 7' is applied to the high pressure chamber 1, the relief valve 6' is raised and the fluid thus introduced into the pressure chamber flows through the bypass 8 and, acting upon the relief valve 9 to lower the latter, enters the low pressure chamber.

As a result, the pressures in the two pressure chambers are equalized immediately to restore the diaphragm to its normal no-input state, whereby any permanent deformation or other trouble with the diaphragm is effectively prevented. It is evident that, if the pressure in the low pressure chamber 2 is reduced to an unusually low level, similarly the pressures in the two pressure chambers 1 and 2 are equalized to give the same advantageous effect.

Having described one embodiment of the invention, which illustrates its basic principles, it is to be understood that various changes and modifications may be made within the scope of the invention. For example, as illustrated in FIG. 4, the high and low pressure pipe lines 11 and 12 connected to the high and low pressure chambers 1 and 2, respectively, may be interconnected by means of a bypass 13 in which a valve 14 operable upon the basis of the same principle as described is arranged.

As apparent from the foregoing, the transducer device of the present invention is based upon an entirely novel conception of equalizing the pressures in the two fluid chambers by utilization of an excessive pressure in contrast to conventional devices which have been designed only to constrain the excessively high pressure by use of the incompressibility of liquid. It will be appreciated that the inventive device is extremely simple in structure, convenient to use and usable to advantage with a wide range of industrial instruments including flow meters.

What is claimed is:

A differential pressure transducer comprising high and low pressure chambers disposed within a single housing and in communication with the upstream side and the downstream side, respectively, of an orifice, a diaphragm separating said chambers being distortable in response to the difference in pressure therebetween, a fluid passage formed within said housing and interconnecting the high and low pressure chambers on either side of said diaphragm, a first relief valve arranged within said fluid passage at the connection of the fluid passage to the high pressure chamber and normally biased toward the high pressure chamber side of said fluid passage by a spring mounted within said fluid passage, a second relief valve arranged within said low pressure chamber and normally biased against said fluid passage at the low pressure chamber side of said fluid passage by a plate spring mounted to the wall of said low pressure chamber, and output means connected to said diaphragm for movement in response to pressure differential.

References Cited by the Examiner
UNITED STATES PATENTS

| | | | |
|---|---|---|---|
| 1,001,810 | 8/1911 | Brown | 73—407 |
| 1,058,092 | 4/1913 | Cooper | 73—407 |
| 1,692,034 | 11/1928 | Griffin | 91—402 |
| 2,044,777 | 6/1936 | Erling | 91—48 |
| 2,310,546 | 2/1943 | Robinson. | |
| 2,336,096 | 12/1943 | Heintz | 91—438 |
| 2,985,020 | 5/1961 | Fisher | 73—407 |

FRED E. ENGELTHALER, *Primary Examiner.*
SAMUEL LEVINE, *Examiner.*